(12) United States Patent
Lambert (10) Patent No.: US 7,787,973 B2
(45) Date of Patent: Aug. 31, 2010

(54) GENERATING A COMPOSITE MEDIA STREAM

(75) Inventor: James P. Lambert, Toluca Lake, CA (US)

(73) Assignee: Clear Channel Management Services, Inc., San Antonio, TX (US)

( * ) Notice: Subject to any disclaimer, the term of this patent is extended or adjusted under 35 U.S.C. 154(b) by 0 days.

(21) Appl. No.: 11/024,889

(22) Filed: Dec. 29, 2004

(65) Prior Publication Data

US 2005/0114529 A1    May 26, 2005

Related U.S. Application Data

(63) Continuation of application No. 09/758,968, filed on Jan. 10, 2001, now abandoned.

(51) Int. Cl.
*G06F 17/00* (2006.01)
*G06F 15/16* (2006.01)

(52) U.S. Cl. .......................... 700/94; 709/203; 709/219

(58) Field of Classification Search ................. 709/231, 709/203, 219; 379/88.13, 908, 265.09, 68; 700/94

See application file for complete search history.

(56) References Cited

U.S. PATENT DOCUMENTS

| | | | | |
|---|---|---|---|---|
| 4,907,277 A | * | 3/1990 | Callens et al. ............... 704/202 |
| 5,506,932 A | * | 4/1996 | Holmes et al. .............. 704/205 |
| 5,517,320 A | * | 5/1996 | Schuler ....................... 386/46 |
| 5,661,787 A | * | 8/1997 | Pocock ................... 379/101.01 |
| 5,983,005 A | * | 11/1999 | Monteiro et al. ............ 709/231 |
| 6,246,752 B1 | * | 6/2001 | Bscheider et al. ......... 379/88.22 |
| 6,249,570 B1 | * | 6/2001 | Glowny et al. ............ 379/88.22 |
| 6,252,946 B1 | * | 6/2001 | Glowny et al. ............ 379/88.22 |
| 6,252,947 B1 | * | 6/2001 | Diamond et al. ......... 379/88.22 |
| 6,288,739 B1 | * | 9/2001 | Hales et al. ............... 348/14.07 |
| 6,317,795 B1 | * | 11/2001 | Malkin et al. ............... 709/246 |
| 6,741,869 B1 | * | 5/2004 | Lehr ........................... 455/557 |
| 6,901,067 B1 | * | 5/2005 | Kalavade ..................... 370/352 |
| 6,990,453 B2 | * | 1/2006 | Wang et al. .................. 704/270 |
| 7,194,752 B1 | * | 3/2007 | Kenyon et al. ................. 725/22 |
| 2002/0092019 A1 | * | 7/2002 | Marcus ........................ 725/37 |

* cited by examiner

*Primary Examiner*—Ryan A Jarrett
(74) *Attorney, Agent, or Firm*—Alan Carlson; Edward J. Marshall, Attorney at Law PLLC (57) ABSTRACT

The present invention discloses a method, apparatus, and article of manufacture for providing information. According to one embodiment of the present invention, at least two data segments are collected. Each data segment is collected from a media stream, and each media stream is located at a different media source. Then, a composite media stream is generated by joining together each of the collected data segments. In another embodiment, the data segment is an audio data segment. The above-described invention has utility for allowing a user/listener to search for an Internet radio station by listening to a composite media stream.

31 Claims, 4 Drawing Sheets

GENERATING A COMPOSITE MEDIA STREAM

RELATED APPLICATIONS

This application is a continuation patent application of U.S. Ser. No. 09/758,968, filed on Jan. 10, 2001, now abandoned.

FIELD OF THE INVENTION

This invention relates in general to computer implemented systems, and more particularly, to a technique for generating a composite media stream.

DESCRIPTION OF RELATED ART

The Internet is a vast collection of global-spanning networks that communicate with each other by using protocols, such as the Transmission Control Protocol (TCP) and the Internet Protocol (IP). Via its networks, the Internet enables many computers, located at different sites around the world, to access information from each other.

The World Wide Web (i.e., the "WWW" or the "Web") is the fastest growing part of the Internet. The Web contains Web pages that incorporate text, graphics, sound, animation, and other multimedia elements. Each Web page is formatted in a language called HyperText Markup Language (HTML). Hypertext links connect the web pages to each other, and to any other pages, graphics, binary files, or multimedia files.

The Web works within a client/server model. Web client software runs on the Web client computers, and Web server software runs on the Web server computer. Web client software—known as the Web browser—interacts with both the user and the Web server software. In particular, the Web browser receives a Universal Resource Locator (URL) request from a user. The URL is a unique identifier for requested information (e.g., a web page, a document, or an object). The Web browser then sends the URL request to the Web server software using Hypertext Transfer Protocol (HTTP). In response to the URL request, the Web server software locates and returns the requested information to the Web browser.

One of the most exciting aspects of the Web is the multimedia content. Users can access audio files and listen to music, sound clips or live (and archived) radio stations from their computers via Web pages. The Web server computer typically sends these audio files to the Web client computer by using a technique called streaming audio. Streaming audio allows a user to play sounds and music on the Web client computer while the Web server computer is sending the file. Accordingly, the user does not have to wait until the entire audio file is downloaded before listening to the audio.

With respect to Internet radio stations, users typically select a particular Internet radio station from an Internet radio Web page. Many Internet radio Web pages contain textual descriptions of certain Internet radio stations which can be accessed from their pages. These textual descriptions allow users to search for an appealing Internet radio station by reading and analyzing text. These textual descriptions are similar to the seek/scan feature provided by many conventional on-air broadcast radio systems because they allow users to preview the Internet radio station's programming and/or format.

The key difference between the textual descriptions and the conventional seek/scan feature is that the seek/scan feature allows a user to search for an appealing broadcast radio station by listening to samples of music. When the listener hears an appealing sample of music, the listener can perform an action, such as clicking a button, which tunes the broadcast radio system to the desired broadcast radio station. The current Internet radio Web pages lack this tuning by ear technique. Thus, there is a need in the art for an improved technique of searching for Internet radio stations.

SUMMARY OF THE INVENTION

To overcome the limitations in the prior art described above, and to overcome other limitations that will become apparent upon reading and understanding the present specification, the present invention discloses a method, apparatus, and article of manufacture for providing information.

According to one embodiment of the present invention, at least two data segments are collected. Each data segment is collected from a media stream, and each media stream is located at a different media source. Then, a composite media stream is generated by joining together each of the collected data segments. In another embodiment, the data segment is an audio data segment.

The above-described invention has utility for allowing a user/listener to search for a media source (e.g., an Internet radio station) by listening to a composite media stream.

BRIEF DESCRIPTION OF THE DRAWINGS

Referring now to the drawings in which like reference numbers represent corresponding parts throughout.

DETAILED DESCRIPION

In the following description of embodiments of the invention, reference is made to the accompanying drawings which form a part hereof, and which is shown by why of illustration, a specific embodiment in which the invention may be practiced. It is to be understood that other embodiments may be utilized as structural changes may be made without departing from the scope of the present invention.

This invention is comprised of a collection of components, which will be referred to herein as the "Scanstream System." It is to be understood that these components may be combined in many different ways to form a variety of combinations within the scope of the invention. Generally, the Scanstream System receives media streams from media sources that stream audio via the Internet.

For each media stream, the Scanstream System samples a segment of the media stream. The segment can be a multimedia data segment that has a pre-defined time duration (e.g., five seconds). The Scanstream System then affixes each data segment with an identification tag, and digitizes both the data segment and the identification tag (referred to collectively as the digitized data). Next, the Scanstream System transmits the digitized data to a client computer.

The Scanstream System performs this sequence for each media stream. When the Scanstream System reaches the last media stream, it cycles back to the first media stream and repeats the sequence. Therefore, the Scanstream System transmits a composite Media stream that contains digitized data from different media sources to a client computer. To put it differently, the Scanstream system creates a composite media stream by joining together data segments from different sources.

The client computer plays and/or displays this composite media stream, together with the identification tags, such that each identification tag is simultaneously displayed and/or played with its associated data segment. At this point, a user can interrupt the composite media stream to select an appealing media data segment by using an input device (e.g., a mouse, keyboard, stylus or some other input device).

In response to such selection, the Scanstream System links the client computer directly to the media stream associated with the selected media data segment. More specifically, the Scanstream System disconnects the client computer from the composite media stream, and connects the client computer to the media stream associated with the selected media data segment. The media stream associated with the selected media segment can be transmitted by any media source, such as an Internet radio station. The user can listen to the media stream associated with the selected media data segment or the user can resume listening to the composite media stream.

It is noted that the Scanstream System constantly transmits one or more different composite streams. This transmission process is independent of the number of client computers that might be receiving a composite media stream at a given point in time. There could be anywhere from zero client computers to an infinite number of client computers receiving a particular composite media stream, at a given point in time.

One advantageous feature of the Scanstream System includes allowing a user to search for and/or scan media sources by listening to samples of music from each media source. In particular, at the client computer, the user will hear and/or see a progression of short samples of longer media streams that emanate from different media sources.

Before providing the details of the Scanstream System, the hardware environments used to implement a client computer and a server computer in one embodiment of the present invention are discussed.

Hardware

Figure 1:
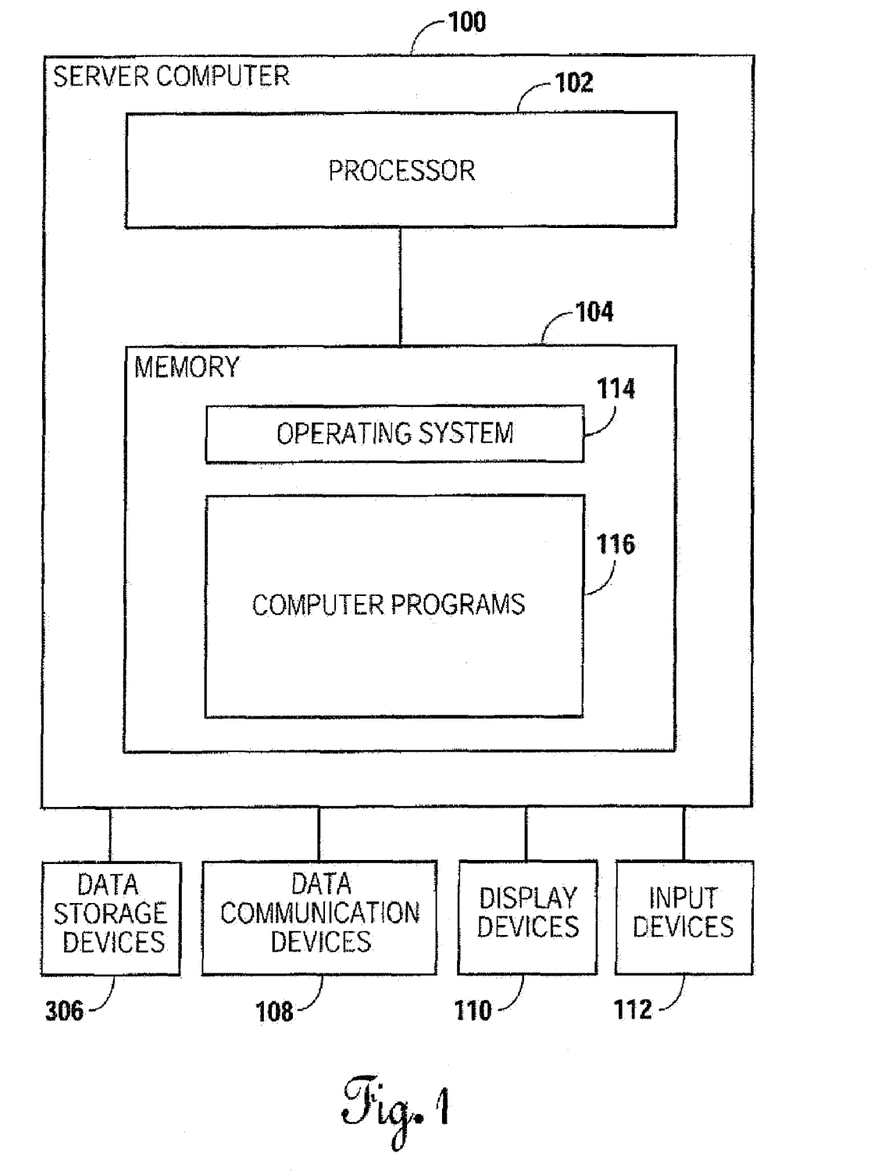
FIG. 1 is a schematic diagram illustrating a hardware environment used to implement a server computer in one embodiment of the invention.

FIG. 1 is a schematic diagram illustrating a hardware environment used to implement a. server computer 100 in one embodiment of the invention. The present invention is typically implemented using a server computer 100, which generally includes a processor 102, a random access memory (RAM) 104, data storage devices 106 (e.g., hard, floppy, and/or CD-ROM disk, drives, etc.) data communications devices 108 (e.g., modems, network interfaces, etc.), display devices 110 (e.g., CRT, LCD display, etc.), and input devices 112 (e.g., mouse pointing device, keyboard, CD-ROM drive, etc.). It is envisioned that attached to the server computer 100 may be other devices, such as read only memory (ROM), a video card, bus interface, printers, etc. Those skilled in the art will recognize that any combination of the above components, or any number of different components, peripherals, and other devices, may be used with the server computer 100.

The server computer 100 operates under the control of an operating system (OS) 114. The operating system 114 is booted into the memory 104 of the server computer 100 for execution when the server computer 100 is powered-on or reset. In turn, the operating system 114 then controls the execution of one or more computer programs 116, such as the controller software for managing the Scanstream System and the encoder software for digitizing media streams. The present invention is generally implemented in these computer programs 116, which execute under the control of the operating system 114, and cause the server computer 100 to perform the desired functions as described herein.

The operating system 114 and computer programs 116 are comprised of instructions which, when read and executed by the server computer 100, cause the server computer 100 to perform the steps necessary to implement and/or use the present invention. Generally, the operating system 114 and/or computer programs 116 are tangibly embodied in and/or readable from a device, carrier, or media such as memory 104, data storage devices 106, and/or data communications devices 108. Under control of the operating system 114, the computer programs 116 may be loaded from the memory 104, data storage devices 106, and/or data communications devices 208 into the memory 204 of the server computer 100 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein, is intended to encompass a computer program accessible from any computer-readable device, carrier, or media. Of course, those skilled in the art will recognize many modifications may be made to this configuration without departing from the scope of the present invention.

Those skilled in the art will also recognize that the environment illustrated in FIG. 1 is not intended to limit the present invention. Indeed, those skilled in the art will recognize that other alternative hardware environments may be used without departing from the scope of the present invention.

Figure 2:
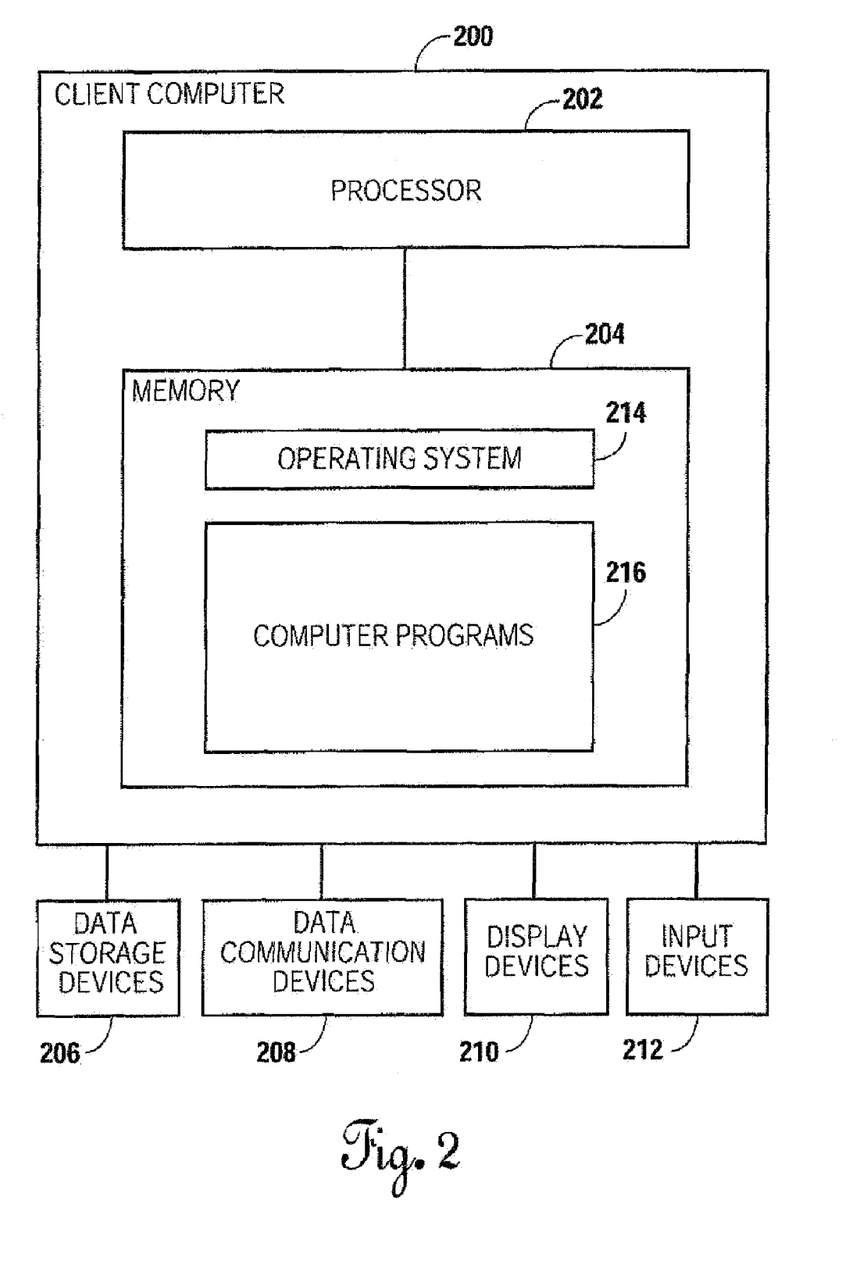
FIG. 2 is a schematic diagram illustrating a hardware environment used to implement a client computer in one embodiment of the invention.

FIG. 2 is a schematic diagram illustrating a hardware environment used to implement a client computer 200 in one of the invention. The present invention is typically implemented using a client computer 200, which generally includes a processor 202, a random access memory (RAM) 204, data storage devices 206 (e.g., hard, floppy, and/or CD-ROM disk, drives, etc.), data communications devices 208 (e.g., modems, network interfaces, etc.), display devices 210 (e.g., CRT, LCD display, etc.), and input devices 212 (e.g., mouse pointing device, keyboard, CD-ROM drive, etc.). It is envisioned that attached to the client computer 200 may be other devices, such as read only memory (ROM), a video card, bus interface, printers, etc. Those skilled in the art will recognize that any combination of the above components, or any number of different components, peripherals, and other devices, may be used with the client computer 200.

The client computer 200 operates under the control of an operating system (OS) 214. The operating system 214 is booted into the memory 204 of the client computer 200 for execution when the client computer 200 is powered-on or reset. In turn, the operating system 214 then controls the execution of one or more computer programs 216, such as software to receive and play/display media streams. The present invention is generally implemented in these computer programs 216, which execute under the control of the operating system 214, and cause the client computer 200 to perform the desired functions as described herein.

The operating system 214 and computer programs 216 are comprised of instructions which, when read and executed by the client computer 200, cause the client computer 200 to perform the steps necessary to implement and/or use the present invention. Generally, the operating system 214 and/or computer programs 216 are tangibly embodied in and/or readable from a device, carrier, or media such as memory 204, data storage devices 206, and/or data communications devices 208. Under control of the operating system 114, the computer programs 116 may be loaded from the memory 204, data storage devices 206, and/or data communication devices 208 into the memory 204 of the client computer 200 for use during actual operations.

Thus, the present invention may be implemented as a method, apparatus or article of manufacture, using standard programming and/or engineering techniques to produce software, firmware, hardware, or any combination thereof. The term "article of manufacture" (or alternatively, "computer program product") as used herein, is intended to encompass a computer program accessible from any computer-readable device, carrier, or media. Of course, those skilled in the are will recognize many modifications may be made to this configuration without departing from the scope of the present invention.

Those skilled in the art will also recognize that the environment illustrated in FIG. 2 is not intended to limit the present invention. Indeed, those skilled in the art will recognize that other alternative hardware environments may be used without departing from the scope of the present invention.

Generating a Composite Media Stream

Figure 3:
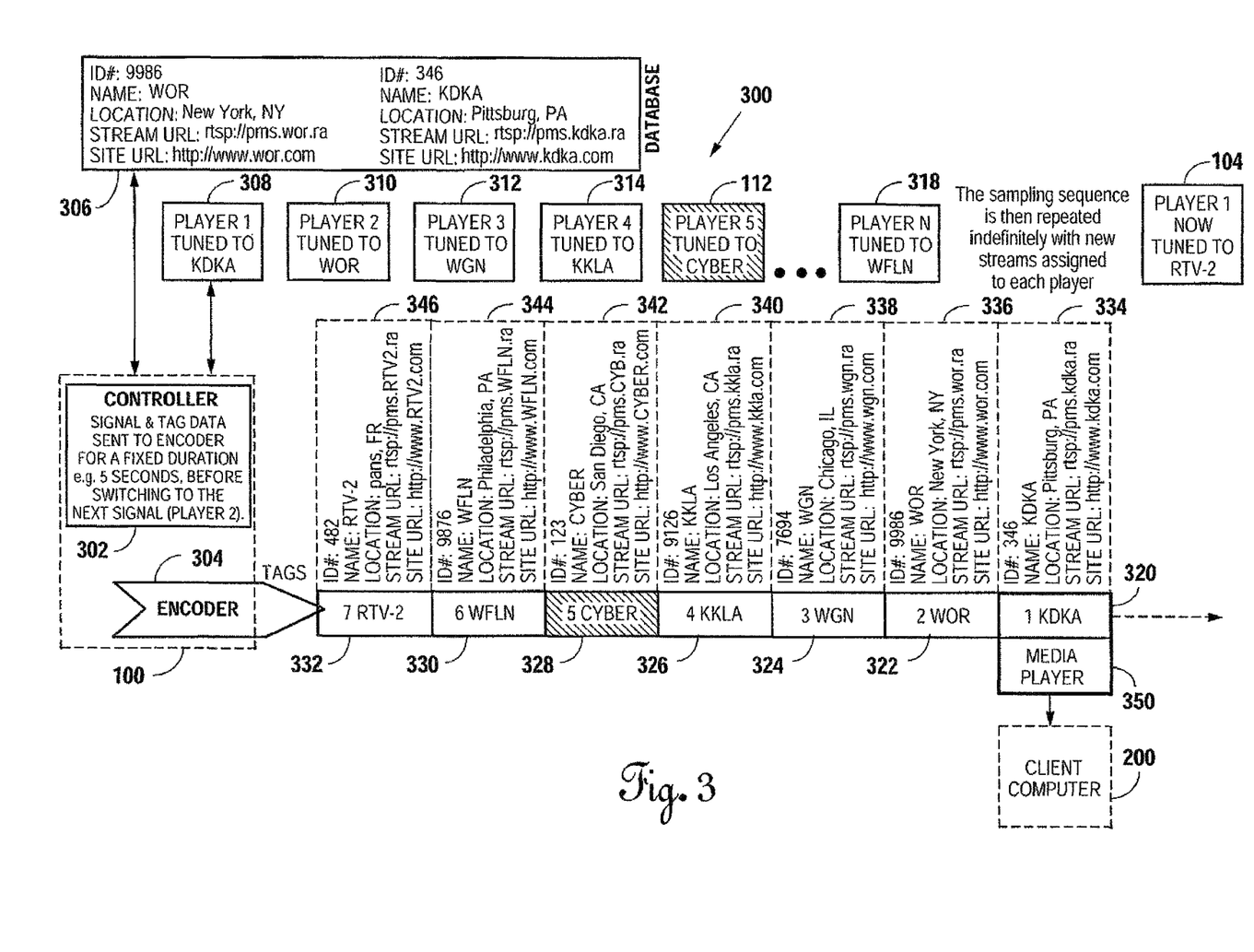
FIG. 3 is a schematic diagram illustrating a client/server computer environment of an embodiment of the present invention.

FIG. 3 is a schematic diagram illustrating a client/server computer environment of an embodiment of the present invention, and more particularly, illustrates a typical distributed computer system 300 using the Internet to connect the server computer 100 to the client computer 200.

The server computer 100 has a controller 302 and an encoder 304. The controller 302 is connected to a database 306 that contains information about the media sources which provide media streams. In FIG. 3, the media sources are Internet radio stations. Those skilled in the art will recognize that other media sources may be used without departing from the scope of the present invention.

The information contained in the database 306 is commonly referred to as identification tags or as tags. In one embodiment of the present invention, each tag consists of multimedia information, including text, graphics, sound, animation, and other multimedia elements.

The tags may also include identification data, such as the following: the identification (ID) number of the Internet radio station; the name of the Internet radio station; the geographic location of the Internet radio station; the Stream URL of the Internet radio station; and the site URL of the Internet radio station. It is noted that each tag may contain two different URLs, the site URL and the stream URL.

The site URL is the address of the Internet radio station's homepage. The stream URL contains a small text file (commonly referred to as a metafile) that has the true location of the audio file.

The controller 302 is also connected to server media players 308, 310, 312, 314, 316, and 318. The controller 302 is capable of tuning each server media player 308, 310, 312, 314, 316, and 318 to a different Internet radio station, such that each server media player 308, 310, 312, 314, 316, and 318 transmits a different media stream to the controller 302.

The controller 302 identifies the number of server media players 308, 310, 312, 314, 316, and 318. The number of server media players is represented herein by the variable N. For media player 1 308, the controller 302 fetches an identification tag from the database 306. Based on the information contained in the tag, the controller 302 tunes media player 1 308 to the Internet radio station identified in the tag. Accordingly, each tag is associated with a different Internet radio station. The controller 302 then receives media player 1 308's media stream. This media stream may be live or archived.

Next, the controller 302 repeats this sequence of fetching, tuning, and receiving for media player 2 310, media player 3 312, media player 4 314, media player 5 316, and media player N 318. At this point, each of the server media players 308, 310, 312, 314, 316 and 318 are tuned into a different Internet radio station, and the controller 302 is receiving media streams from each of the server media players 308, 310, 312, 314, 316 and 318.

For the media stream provided by media player 1 308, the controller 302 sends both the media stream and its associated tag to the encoder 304 for a fixed time duration, e.g., five seconds. This fixed time duration could be a pre-defined, default time duration or a user-defined time duration. Since, the controller 302 only transmits the media stream and its associated tag for a fixed time duration, the digitized data is really a data segment of a longer media stream.

The encoder 304 digitizes both the media stream and its associated tag (collectively referred to herein as the "digitized data"). The encoder 304 transmits this digitized data to the client media player 350, and the client media player 350 sends the digitized data to the client computer 200. The client computer 200 then plays and/or displays the digitized data, such that each data segment and its tag are simultaneously displayed to the user. The server computer 100 is connected to the client computer 200 via the Internet.

After the fixed time duration, the controller 302 and the encoder 304 perform the same actions on the media stream provided by media player 2 310. That is, the controller 302 sends both the media stream and its associated tag to the encoder 304 for the fixed time duration, and the encoder 304 digitizes the media stream and its associated tag. The controller 302 then tunes the previous media player—media player 1 308—to a new Internet radio station, and thus, the controller 302 receives a new media stream from media player 1 308. The controller 302 and the encoder 304 continue in this manner for each media stream, until the controller 302 reaches the media stream provided by media player N 318. The controller 302 then starts over with the new media stream provided by media player 1 308.

At the client computer 200, a user can interrupt the composite media stream 352 to select an appealing media data segment by using an input device (e.g., a mouse, keyboard, stylus or some other input device). The user can make this selection at any time during the play and/or display of the composite media stream 352. In response to such a selection, the Scanstream System links the user directly to the media stream associated with the selected media data segment. More specifically, the Scanstream System disconnects the user from the composite media stream, and connects the user to the media stream associated with the selected media data segment. The user has the option of listening to the media stream associated with the selected media data segment or the user can resume listening to the composite media stream 352.

It is noted that the Scanstream System generates the composite media stream when the controller 302 transmits media streams to the encoder 304 for a fixed time duration. The composite media stream 352 contains data segments 320, 322, 324, 326, 328, 330, and 332, along with their associated tags 334, 336, 338, 340, 342, 344, and 346.

In one embodiment of the present invention, the Scanstream System can simultaneously transmit two or more different composite media streams, with one composite media stream containing samples of Jazz Internet radio stations, and another composite media stream containing samples of Parisian Internet radio stations. In this embodiment, the user can select the type of composite media stream. For example, a user can select a composite media stream that contains samples of Rock Internet radio stations. A user can also select a composite media stream that contains sample of Internet radio stations that are located in Paris. In addition, the user can select a composite media stream that includes a combination of categories, such as Jazz Internet radio stations and News Internet radio stations or any other available combination.

The Scanstream System will constantly and simultaneously transmit the most popular categories, e.g., Jazz, Rock, News, and Rap. For unpopular categories, such as Poughkeepsie, a user can request that the Scanstream System create and transmit a composite media stream containing samples of Poughkeepsie Internet radio stations.

Figure 4:
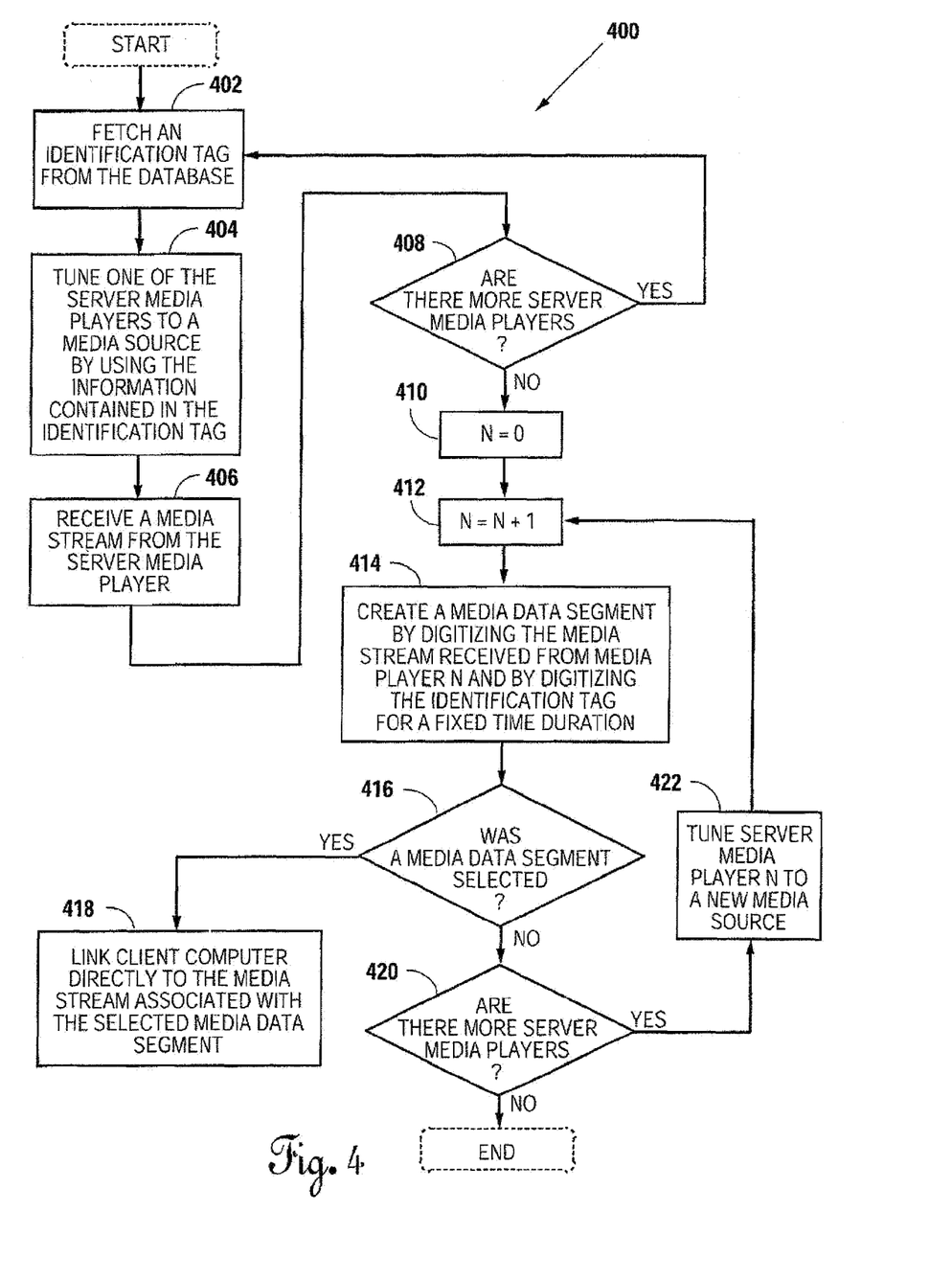
FIG. 4 is a flow diagram illustrating the process performed by the Scanstream System.

FIG. 4 is a flow diagram 400 illustrating the process performed by the Scanstream System. Block 402 represents the Scanstream System fetching an identification tag from the database 306 (shown in FIG. 3). Block 404 represents the Scanstream System tuning a server media player 308, 310, 312, 314, 316 or 318 (shown in FIG. 3) to a media source by. using information contained in the identification tag. In particular, the Scanstream System tunes the server media player 308, 310, 3 12, 314, 316 or 318 by using the both the stream URL and the site URL. The Scanstream System then receives a media stream from the server media player 308, 310, 312, 314, 316 or 318, as represented by block 406.

Block 408 is a decision block that represents the Scanstream System determining whether there are more server media players 308, 310, 312, 314, 316 or 318 (shown in FIG. 3). When there are more server media players 308, 310, 312, 314, 316, or 318, the Scanstream System returns to block 402. Otherwise, the Scanstream System proceeds to block 410.

Block 410 represents the Scanstream System initializing the variable N to zero. The variable N is a variable that represents the number of sever media players. Block 412 represents the Scanstream System incrementing the variable N by one.

Block 414 represents the Scanstream System creating a media data segment (or a sampling sequence) by digitizing both the media stream received from media player N and its associated tag for a fixed time duration. In one embodiment of the present invention, the fixed time duration is a pre-defined, default time duration. In another embodiment, the fixed time duration is a user-defined time duration.

Block 416 is a decision block that represents the Scanstream System determining whether the user has selected a media data segment. When the user selects the media data segment, the Scanstream System links the client computer directly to the media stream associated with the selected media data segment, as represented by block 418. Otherwise, the Scanstream System proceeds to block 420.

Block 420 is decision block that represents the Scanstream System determining whether there are more server media players. When there are more players, the Scanstream system proceeds to block 422. Otherwise, the Scanstream System ends.

Block 422 represents the Scanstream System turning server media player N to a new media source. The Scanstream System then returns to block 412.

CONCLUSION

This concludes the description of the preferred embodiment of the invention. The following describes some alternative embodiments for accomplishing the present invention. For example, other hardware environments may include without limitation, communications devices, such as appliances, personal digital assistants (PDAs), wrist watches, stand alone Internet radios, set top boxes, television systems, mainframe computers, minicomputers or personal computers. These may be used in various configurations, such as in a local area network or in conjunction with the Internet. These other environments may work with each other or may work independently.

The foregoing description of the embodiments of the invention have been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed:

1. A method comprising:
   automatically collecting samples from a plurality of media streams, said plurality of media streams emanating from different media channels and collected using a plurality of different server media players, wherein the collecting of samples comprises:
   obtaining source addresses corresponding to individual streams of said plurality of media streams from a database storing a plurality of tags associated with each of the individual streams;
   combining at least one of the plurality of tags with each of the samples, wherein each tag includes a plurality of different addresses, including the obtained source address corresponding to the media stream from which the sample was collected and an address of a website from which the obtained source address can be obtained, and the associating tags with said samples comprises:
   linking said samples and the associated tags together to create tagged samples;
   generating a composite media stream by joining together said tagged samples; and
   transmitting said generated composite media stream over a network to a remote client media player.

2. The method of claim 1 wherein generating said composite media stream further comprises:
   maintaining said linked samples and tags for a predetermined time duration before switching to another sample.

3. The method of claim 1 wherein said different media channels utilize the Internet as a transmission media.

4. The method of claim 1 wherein said different media channels utilize a network communication protocol.

5. The method of claim 1 wherein a tag linked to a sample includes a plurality of different universal resource locators.

6. The method of claim 1, further comprising:
   receiving, from a media player running on a client machine, an indication that a tag linked to one of the samples in the composite media stream has been selected; and
   connecting said client media player to the media stream from which the sample was collected.

7. The method of claim 6, further comprising disconnecting the client media player from the composite media stream.

8. The method of claim 1, wherein the plurality of tags each include multimedia information.

9. The method of claim 1, wherein the samples have a predetermined time duration.

10. The method of claim 1, wherein each of said plurality of media streams from which samples are collected includes content is from a user-defined category.

11. The method of claim 1, wherein at least one of said plurality of media streams from which samples are collected is a live media stream.

12. The method of claim 1, wherein at least one of said plurality of media streams from which samples are collected is an archived media stream.

13. An apparatus comprising a computer adapted to:
automatically collect samples from a plurality of media streams using a plurality of different media players, said plurality of media streams emanating from different media sources;
obtain identification information corresponding to each of said plurality of media streams from the media source of each of said plurality of media streams;
associate tags with said samples, wherein each tag associated with a sample includes the obtained identification information corresponding to the media stream from which the sample was collected and at least one multimedia element;
digitize the samples and the associated tags together, wherein the digitized samples and associated tags together form tagged samples;
generate a composite media stream by joining together said tagged samples;
transmit said generated composite media stream over a network to a remote client media player;
receive, from the client media player, an indication that a tagged sample has been selected;
discontinue transmitting the composite media stream to the client media player in response to receiving the indication; and
further in response to the indication, initiate a connection between the client media player and the media stream from which the sample included in the tagged sample was collected.

14. A method for scanning Internet media streams, said method comprising:
automatically collecting samples from a plurality of Internet media streams using a plurality of server media players, each sample being generally representative of at least one of said plurality of Internet media streams, wherein the collecting samples comprises:
obtaining first identifiers corresponding to stream addresses from which each of said plurality of Internet media streams can be obtained;
associating tags with said samples, wherein each tag associated with a sample includes the first identifier corresponding to the Internet media stream from which the sample was collected and a second identifier, separate from the first identifier, corresponding to a site address, and the associating a tag with each sample comprises:
digitizing said samples and the associated tags together, wherein the digitized samples and associated tags together form tagged samples;
generating a composite Internet media stream by joining together said tagged samples; and
transmitting said generated composite media stream over a network to a remote client media player.

15. A method for scanning Internet radio streams, said method comprising:
automatically collecting samples from a plurality of Internet radio streams using a plurality of different media players located at a server, each sample being generally representative of at least one of said plurality of Internet radio streams, wherein the collecting samples comprises:
obtaining station identification information corresponding to each of said plurality of Internet radio streams, the station identification information including Uniform Resource Locators pointing to home pages of radio stations providing respective Internet radio streams;
associating tags with said samples, wherein each tag associated with a sample includes the obtained station identification information corresponding to the Internet radio stream from which the sample was collected, and further includes at least one multimedia element, and the associating tags with said samples comprises:
digitizing said samples and the associated tags together, wherein the digitized samples and associated tags together form tagged samples;
generating a composite Internet radio stream by joining together said tagged samples; and
transmitting said generated composite media stream over a network to a remote client media player.

16. The method of claim 15, wherein each tag comprises a stream uniform resource locator pointing to the location of the stream.

17. The method of claim 15, wherein each sample has a predetermined time duration.

18. The method of claim 15, wherein each of said plurality of media streams from which samples are collected includes content from a user-defined category.

19. The method of claim 15, wherein at least one of said plurality of Internet radio streams from which samples are collected is a live radio stream.

20. The method of claim 15, wherein at least one of said plurality of Internet radio streams from which samples are collected is archived radio stream.

21. A method comprising:
automatically collecting samples, at a server, from a plurality of Internet broadcasting streams by tuning each of a plurality of different media players to a different broadcasting stream, wherein the collecting samples comprises:
obtaining tags corresponding to each of said plurality of Internet broadcasting streams from a database;
associating the tags with said samples, wherein each tag associated with a sample includes identification information corresponding to the Internet broadcasting stream from which the sample was collected and a multimedia information element, and the associating tags with said samples comprises:
digitizing samples and the associated tags together, wherein the digitized samples and associated tags together form tagged samples;
generating a composite stream by joining together said tagged samples; connecting said generated composite media stream over a network to a remote client media player;
receiving, from the remote client media player, an indication that a tagged sample has been selected; and
in response to receiving the indication, connecting the remote client media player to the Internet broadcasting stream from which the sample included in the tagged sample was collected.

22. A method comprising:
automatically collecting samples from a plurality of different media streams each of said media streams emanating from a different media source, wherein the collecting samples comprises:
obtaining, from a database, a plurality of tags associated with respective ones of the plurality of different media streams, each tag including at least one multimedia element;
tuning each of a plurality of server media players to a media stream of the plurality of different media streams;
creating tagged samples, each tagged sample including both a sample of the media stream tuned by one of the plurality of server media players and at least one tag of the plurality of tags associated with the media stream;
generating a composite media stream by joining together said tagged samples; and
transmitting said generated composite media stream over a network to a remote client media player.

23. A method comprising:
collecting, using a first server media player, a media segment from a first data stream, where the first data stream includes a first source identifier;
collecting, using a second media player of the server, a media segment from a second data stream, where the second data stream includes a second source identifier;
establishing a connection with a client media player;
generating a third data stream to be transmitted to the client media player, the third data stream comprising at least part of the media segments from the first data stream and from the second data stream;
tagging a first portion of the third data stream corresponding to the media segment from the first data stream with the first source identifier;
tagging a second portion of the third data stream corresponding to the media segment from the second data stream with the second source identifier;
tagging the first portion of the third data stream with a third source identifier separate from, and in addition to, the first source identifier;
accepting input indicating that one of the first portion and the second portion of the third data stream has been selected; and
connecting the client media player to one of the first data stream or the second data stream in response to the input, wherein the connecting is performed utilizing the source identifiers.

24. The method of claim 23 wherein the client media player receives and stores the source identifiers from the third data stream.

25. The method of claim 23 wherein the source identifiers comprise uniform resource identifiers.

26. The method of claim 23 wherein the media segments have a predetermined time duration.

27. The method of claim 26 wherein the wherein the predetermined time duration is a user selectable time duration.

28. The method of claim 23 wherein the first and second streams are transmitted based on a user selection.

29. The method of claim 23 wherein the first and second streams are selected for sampling based on a user selected music category.

30. The method of claim 23 further comprising storing the source identifiers from the first data stream and the second data stream at the client media player.

31. The method of claim 30 wherein the client media player connects to the first media stream by selecting a tag including the stored source identifiers.

* * * * *